May 5, 1936.  C. H. HOWLAND-SHEARMAN  2,039,841
METHOD FOR WORKING SUBSTANCES
Filed July 27, 1934   3 Sheets-Sheet 1

INVENTOR
Charles H. Howland-Shearman
BY
ATTORNEY

May 5, 1936.   C. H. HOWLAND-SHEARMAN   2,039,841
METHOD FOR WORKING SUBSTANCES
Filed July 27, 1934   3 Sheets-Sheet 3

INVENTOR
Charles H. Howland-Shearman.
BY
ATTORNEY

Patented May 5, 1936

2,039,841

UNITED STATES PATENT OFFICE 2,039,841

METHOD FOR WORKING SUBSTANCES

Charles H. Howland-Shearman, Hamden, Conn.

Application July 27, 1934, Serial No. 737,161

9 Claims. (Cl. 164—125)

This invention relates to a method of working substances having a formation as hereinafter described.

The invention has many new and useful applications particularly in the metal working art, and an object of the invention is to provide a new and useful method of working metals which is less costly than known methods and which produces a new and useful product having many uses in the arts.

Other objects are more fully hereinafter set forth and will be apparent from the following specification wherein by way of illustration the invention is described in connection with working cast iron. It will be understood, however, that this substance is referred to merely by way of illustration as the invention applies to all substances having a suitable structure. By "suitable structure" is meant any structure or material to which the herein described method is applicable.

Materials may be generally classified for the purposes of this specification in four groups, hereinafter referred to and may be distinguished by the usual tests employed in crystallography.

Figure 1:
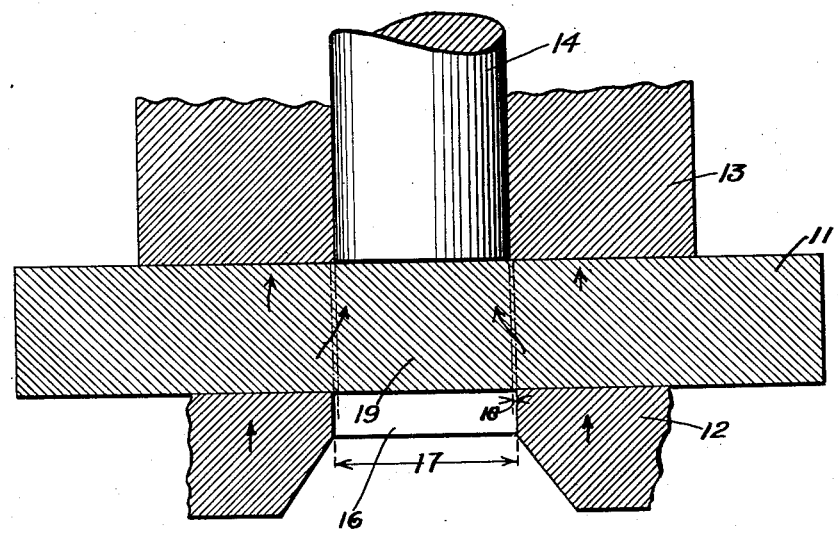
Figure 1 is a diagrammatic view of a work piece set up in suitable apparatus for producing a hole therein by the process herein described.

Brief reference will first be made to the characters of materials in general, in order that the invention may be clearly understood.

"A crystal is the regular polyhedral form, bounded by smooth surfaces, which is assumed by a chemical compound, under the action of its intermolecular forces, when passing, under suitable conditions, from the state of a liquid or gas to that of a solid." (Dana.)

As expressed in the foregoing definition, a crystal is characterized first by its definite internal molecular structure and secondly by its external form. Some species occur not in distinct crystals but in massive form, and in some exceptional cases the definite molecular structure appears to be absent.

By definite molecular structure is meant the special arrangement which the physical units, called molecules, assume under the action of the forces exerted between them during the formation of the solid. The definite molecular structure is the essential character of a crystal and the external form is only one of the ways although the most important in which this structure is manifested. Thus, it is found that all similar directions in a crystal, or a fragment of a crystal, have like physical characters, as of elasticity, cohesion, action on light, etc. It is evident, therefore, that a small crystal differs from a large one only in size and that a fragment of a crystal is itself essentially a crystal in all its physical relations, although showing no crystalline faces.

It is believed that all solid bodies are made up of definite physical units, called the physical, or crystal, molecules. Of the form of the molecules, nothing is definitely known, and though theory has something to say about their size, it is enough here to understand that they are almost infinitely small, so small that the surface of a solid—e. g. of a crystal—may appear to the touch and the eye even when assisted by a powerful microscope, as perfectly smooth. The molecules are further believed to be not in contact but separated from one another, if in contact, it would be impossible to explain the motion to which the sensible heat of the body is due, or the transmission of radiant heat and light through the mass by the wave motion of the ether, which is believed to penetrate the body.

When a body passes from the state of a liquid or gas to that of a solid, under such conditions as to allow perfectly free action of the forces acting between the molecules, the result is a crystal of some definite type as regards symmetry. The simplest hypothesis which can be made assumes that the form of the crystal is determined by the way in which the molecules group themselves together in a position of equilibrium under the action of the intermolecular forces.

Solid materials may be roughly classified in four groups:

(a) Those which in themselves constitute a single crystal individual, or which constitute a crystalline aggregate made up of a multitude of crystal individuals.

(b) Substances which are partly crystalline but contain cementitious amorphous substances.

(c) Those having micro-structures of dissociate crystals aggregated with a non-cementative amorphous material.

(d) Those in which definite molecular structure is wanting, and all directions in the mass are sensibly the same. Such substances are commonly said to be amorphous.

In the copending application Serial No. 702,286 filed December 14, 1933 is described a method of cold flowing materials such as listed under headings (a) and (b) above. The present invention applies to a method of cold working substances listed under (c) and (d) above composed of non-cemented dissociate crystals, such as grey cast iron, or amorphous substances of a brittle nature such as glass.

An object of the invention is to provide a method by which smooth and accurate holes can be produced in substances of the above nature by the application of pressures without application of exterior heat.

Another object is to provide a method by which such holes can be produced rapidly.

A further object is to provide a process by which the material removed in producing the above holes is reduced to powder or finely divided granules.

Briefly stated, the method consists in subjecting the material to a compressive pre-pressure throughout the area surrounding the portion to be removed, thereby mapping a plane on which division is desired, at the same time subjecting the portion to be removed to a pre-pressure in one direction, then increasing the latter pressure by a relatively large force applied at low initial speed, the said speed increasing in parabolic proportion to the tool travel or yield of the material, and at the same time maintaining compressive pressure on the material to be preserved.

The result of the above procedure is in some cases an explosive structural disintegration throughout the mass of material to be removed, which is thereby ejected, leaving a smooth and accurate hole.

It has been shown in beforementioned application Serial No. 702,286, how certain materials may be reduced to a state of fluidity along a slip plane by the application of pressure in a manner similar to that above. The line of demarcation between materials in which flow occurs and in which structural disintegration occurs is defined by the relation between the structural strength of a given material as a whole and the susceptibility of any considerable constituent thereof to being rendered plastic under pressure. Thus a material of structural strength sufficiently high to resist disintegration under pressure sufficient to produce plasticity in a part thereof may be caused to flow. Wax, an amorphous substance, and steel, a cemented crystalline aggregate, are examples of flowing materials. On the other hand materials containing no considerable element capable of being rendered plastic by any pressures insufficient to overcome the structural strength of the material as a whole under the circumstances of pressure application do not flow but are structurally disintegrated. Examples of this type of substance are (d) glass, an amorphous substance and grey cast iron (c), a mass of dissociate crystals.

The following figures and description set forth the method of working materials of the latter type in accordance with the objects of the invention:

Referring to Figures 1, 2, 3, 4 and 5, the numeral 11 denotes a work piece of the type of material described, for example grey cast iron. A rest plate 12 supports the piece 11 and initially applies a pressure upward through it against an upper resisting member 13, hereinafter referred to as a fracture-proofer, and against a cylindrical tool 14 having a diameter 15. The rest plate 12 has a circular opening 16 coaxial with tool 14 and having a diameter 17 sufficiently larger than 15 to allow a slight clearance 18. The numeral 19 denotes the portion of piece 13 directly under the tool 14, being the portion desired to be removed.

A pre-pressure being applied upward by the rest plate 12, the portion of piece 11 under the fracture proofer 13 is subjected to compression. At the same time the portion 19 is subjected to an initial downward pressure due to the resistance of the tool 14.

A working pressure is now applied downward by the tool 14, this pressure building up rapidly with very low but increasing speed of the tool, until the entire mass of portion or blank 19 suddenly breaks into powdered or fine granular form and is ejected, leaving a clean, smooth hole in the piece 11.

Figure 2:
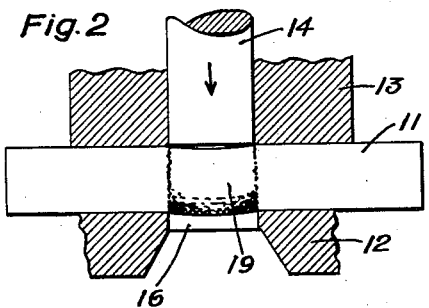
Figures 2, 3, 4 and 5 illustrate diagrammatically successive stages of the process.

The above phenomenon may be thus explained: As the working pressure exerted by the tool 14 builds up, a bending movement is set up across the slight clearance 18, thereby producing a downward bulge of the portion 19. During this distortion the mass of 19 is subjected to internal stresses tending to separate its structure into horizontal strata or layers, due largely to the gripping of the fracture proofer 13, as illustrated in Figure 2. The movement of the tool being very gradual as the pressure builds up, and outward compressive components being set up at the bottom of the reverse bends in the clearance 18, an immediate shearing fracture does not occur along 18. During the downward bulging movement of portion 19 its lower mass is placed in tensile stress tending to separate the structure. The tendency to separate is a maximum in the lowest layer which has no central support but itself supports all layers above it.

Figure 3:
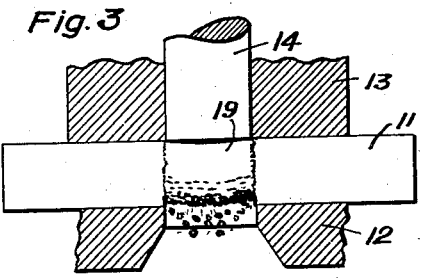
Figure 4:
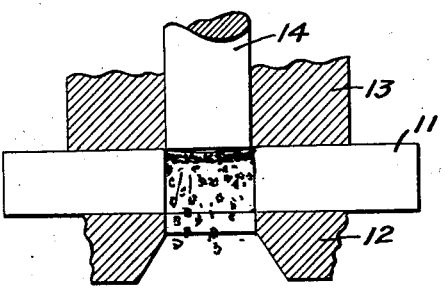
Figure 5:
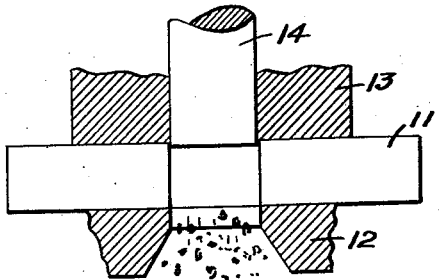

The conditions described build up until the lowest layer fails as illustrated in Figure 3, the brittle structure separating into particles which leave the mass. This failure transfers the maximum stress to the next layer above which immediately fails in the same manner, and transfers the stress to the next higher layer. A progressive failure thus occurs which travels upward until the entire portion 19 is expelled from the hole, Figure 5. The failure of successive layers occurs so rapidly as to be practically simultaneous, the expulsion of the entire mass occurring with explosive violence which carries the failure out to the limiting plane defined by the compression zone between the rest plate 12 and fracture proofer 13. The structure of this portion being compressively supported is not disturbed but is left with an accurate and smooth satin-like or slightly stippled inner surface produced by the break-up and sudden expulsion of the adjacent structure of portion 19.

Figure 6:
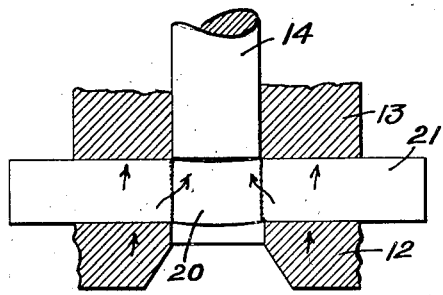
Figures 6 and 7 illustrate a variation of the process occurring in dealing with certain materials hereinafter described.
Figure 7:
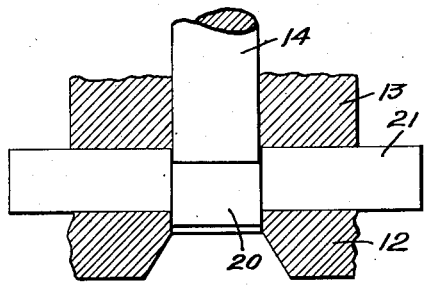

In the case of certain border-line materials, that is materials of fair tensile strength but without sufficient constituent capable of plasticity to allow cold flow, as described in the application Serial No. 702,286 heretofore mentioned, to occur, the failure of the material occurs first along the clearance 18, Figures 6 and 7, the removed mass 20 coming out a solid slug. Due to the comparatively slow and gentle build-up of the tremendous pressures available and the fracture proofing compression, the plane of parting is held accurately within the clearance 18 instead of occurring as an irregular fracture such as takes place under shock or sudden shear as produced in punching. In the passage downward of slug 20 after parting, the outer surface of 20 acts as a lap on the hole surface which is rendered smooth and accurate.

Mention is made here of materials of dissociate crystalline micro-structure in order to clearly distinguish from materials of the cemented crystalline group, but with either group holes or surfaces defined by operations on them as herein described have superficies built up of crystals and are as smooth as said crystals will permit. In the case of dissociate crystalline structure, densification of the superficies apparently takes place along the line of flow in the work area, without the presence of cementitious flux.

As might be expected from such conditions it has been found feasible to make thousands of holes in any suitable material, where the difference between the diameter of the tool 14 and that of the flowed hole would average .0002" or less.

At this point, it may be said that the tool 14 starts to work resting upon the upper surface of the work piece 11 and therefore it does not strike a blow. The tool follows through the piece 11, pushing the blank 20 out, but performs no work on the metal except to define peripherally the area in which the parting takes place. The necessary speeds, pressures, and other operative data necessary to produce this result are hereinafter referred to in connection with the method herein disclosed. The opening 16 does not form a die or cutting tool, nor should the tool 14 be considered a punch. The opening 16 is made practically with a very small clearance, in respect to the tool 14. It simply aids the tool in defining the work boundary.

The expression "performs no work" used above means that the tool performs no cutting work.

The action of the tool is to maintain on the portion of material being moved, a pressure constantly equal to the residual resistance, at a rate of motion corresponding to the natural rate of yield of the material.

From the foregoing the phenomena herein described as "cold working" will be understood. It is a phenomenon hitherto unknown and can be practiced by the method and apparatus herein disclosed.

A method for producing said working, for example in cast iron, will now be disclosed.

Any suitable mechanism may be used to apply the pre-pressure necessary for fracture-proofing as heretofore referred to, and referring again to Figure 1, it will be observed that when the piece 11 is locked between the clamp members that a certain amount of pressure (indicated by the arrows) is transmitted upwardly from the bottom member 12, and through the piece 19 to the tool 14, which is held in fixed position down against the upper surface of the piece. This upward pressure applied to the tool as aforesaid, is for the purpose of eliminating any free space between the tool and the work and any lost motion in the mechanism used to apply the tool to the work.

The work is therefore locked under compression and like a diaphragm, spans the hole in the rest plate 12, and the tool is resting upon the work under a preliminary pressure conveniently applied from below, the preliminary pressure being in one machine as an example on a plate ½" thick of cast iron, of 30,000 pounds.

The working of the metal is now accomplished by a downward pressure of the defining tool 14 which cooperates with the rest plate 12 in the manner previously described to push the blank 19 from area 18 below the tool which the configuration of the tool and rest plate determines. For example, the tool may take the outer form of a gear wheel provided with peripheral teeth in which event the material or blank ejected from area 18 would leave the piece 11 in the form of an internal gear corresponding exactly in dimensions to the tool that made it, but with a surface fineness not limited by the fineness of the tool and rest plate but only by the nature of the material used and the rearrangement of its superficies.

In the case of a ¾" hole to be made in ½" thick stock, the fracture-proofing pressure on the upper clamp member 13 would be a total of fifteen tons downwards and the upward pressure on the rest plate or clamp member 12 would be a total of thirty tons; that is a total of thirty tons is applied upward to the work by lower member 12, fifteen tons of which pressure is resisted by the fracture-proofer or clamp member 13. The remaining fifteen tons of pressure is resisted by the linkage backing the tool 14. The result is static equilibrium. The working pressure, that delivered to the tool 14, will be a total of 30,000 pounds at the beginning of the downward movement of the tool.

It will be evident from the foregoing that very great pressures are required in order to produce the phenomenon herein described to make practical use of this discovery, and that it is necessary that these pressures be applied not only in a highly efficient manner but so that the pressure on the tool decreases with the linear advance of same through the work after the initial yield or stratified molecular displacement slippage; the pressure must be applied at speed inversely proportional to the instantaneous resistance of the substance being worked. This is not only necessary to eliminate punching action, but is also necessary in order that the machine applying the pressures will not be distorted and perhaps wrecked by the pressure it applies to the work. Also the mechanism used must advance the tool through or on the work by very fine increments at great pressures without lost motion and with great uniformity of motion in order to prevent irregular fracture and preserve the accuracy of the plane of parting.

It is therefore necessary at this point to briefly discuss the apparatus necessary to carry out the method as herein set forth, wherein the principles of the infinite plane are employed.

An infinite plane is a plane of indeterminable extent, all of the lines of which lie in the same planar surface.

If a body, having a linear axis coinciding with a line in any infinite plane, and pivotally sustained at one end upon a revoluble transverse axis, also coinciding with a line in said infinite plane, be infinitesimally raised on such revoluble transverse axis out of its absolute coincidence in said infinite plane, the kinetic relationship of such body to such infinite plane is then expressed in the formula:

$$\frac{\cos \theta}{\sin \theta} = \infty$$

That is to say, it approximates theoretic infinity, though infinitesimally finite, assuming $\theta = 0°0'1''$.

If two straight bodies, having linear axes coinciding with each other, and both of said axes coinciding with a line in an infinite plane, be mutually joined by a pivot having a transverse axis also coinciding with a line in said plane, and if one end of one body thereof be pivotally supported upon a transverse axis likewise coinciding with a line in said infinite plane, and the opposite end of the other body thereof lying in said plane shall be free to move therein, then, upon infinitesimally raising the mutually-articular transverse axis of such bodies, the one body infinitesimally rotating upon its transverse pivot, and the other body infinitesimally moving in said plane, the kinetic relationship of such composite, mutually-articulate bodies to such plane is expressed in the following formula:

$$\frac{\cos \theta}{2 \sin \theta} = \infty$$

That is to say, the kinetic value of such bodies in relation to such plane is a theoretic approximation of infinity, but actually immensurably finite, assuming $\theta = 0°0'1''$.

This infinite plane apparatus consisting of two articulated levers, one of which is anchored and the other free, presents a classical example and is wholly differentiated from all other single mechanical elements.

The infinite plane has the peculiar trait, separating it from all other known mechanical elements, that in it alone, is found a physical embodiment of the infinitely fine functions of the angle itself.

The mathematical expression an "infinite plane" as used in this specification signifies the condition of two mutually articulated links, each having a pivot at its outer end parallel to the central articulating pivot, with all pivots lying in a straight line, called the planar axis.

If one end pivot be rotatably anchored and the other end pivot be free to move only in the line of the planar axis, then by retracting the central pin from the planar axis, thus rupturing the infinite plane, the free end pin is pulled toward the anchored pin.

The links thus actuated are pulling or tractor levers, since their sole function is to pull in the free end pin.

By way of illustration, consider the case of a mechanical embodiment of an infinite plane made of two levers, each 24″ long, being anchored at one end, and having the opposite end free to move in a guide coincident with the planar axis, so that its levers occupy the straight line, or infinite plane, at their start of operations. Suppose the central articulation is moved 1/64″ away from the planar axis; as a result the free end of the infinite plane has approached the fixed anchored end by .0000118″, and the levers have each assumed to the planar axis an angularity of 0°, 2′, 14″.

Upon analyzing this apparently simple statement, it is found that the mathematical and physical phenomena involved are quite complex, and that the mere superficial statement of the angle assumed does not even adequately indicate what has taken place. Assume that the mechanical embodiment of the infinite plane has been connected by mechanism so as to work upon some object; the pulling motion exerted at the end of this 1/64″ breaking or angular travel of the tractor levers, and amounting to the above .0000118″, does not at all indicate the infinitesimal complexity of which it is made up. As a matter of fact, the tractor levers have departed from the plane and have moved through 134 seconds to arrive at the above angle, which means that during each of those seconds the free end has only approached the anchored end by .00000009″, or by a motion very much less than the known thickness of a crystalline layer of any probable substance that could be worked upon, such as steel or brass, etc.

This phenomenon can be analyzed in its practical aspects, first as to its implications of pressure, and second as to its significance in pure motion.

By the well known formula, $$\frac{\cosine \theta}{2 \sine \theta} = K. E.$$

the kinetic efficient, or proportion of pressure delivered by the mechanical embodiment of the infinite plane as related to the pressure imparted to the infinite plane gives under conditions as above $$\frac{23.999988''}{.015625''} = 1537 \text{ K. E.}$$

Therefore if a pressure of one ton is applied to pull the articulation away 1/64″, the free end of the tractor lever approaches the anchored end of the tractor lever with a pressure of 3,074,000 lbs. Obviously, in an ordinary machine many tons would be applied so that it is now evident that the pressure developed at this stage of the motion breaking the tractor levers is relatively limitless, or technically "infinite."

In striking contrast to the above pressure aspect stands the motion aspect. The mensurable thickness of the strata of ordinary commercial materials, representing crystalline layers one crystal deep, might be fairly expressed, according to the metals used, as being from .00001″ to .000015″, so that, the motion per second of angular travel of the plane is only 1/167th of the actual average thickness of the crystalline strata of bodies making up materials in common use. The significance of this fact is that while the plane is practically infinite in power, it is so infinitesimal in the gentleness of its minute increments of motion, that its approach to a given resistance-duty transcends the perfection of any other conceivable mechanical agent in all the realm of nature,—a trait well implied by its name, "the infinite plane".

Amongst all known mechanical agents, the mechanical equivalent of the infinite plane alone functions to bring into play ratios from literal infinity to finite values in a single physical object. By its very nature, it can never operate except as a pulling effort, hence such physical object, in all classes of machinery where the infinite plane can be used, is called a tractor-lever, i. e., a pulling-lever. The infinitesimality of the efforts of these pulling-levers is the source of their successful relation to the resistance of the crystalline structure of any material worked upon, and this infinitesimality is directly due to the effect of the minute gradations of the functions of the angle itself being translated into the functions of the tractor-levers.

For example, between the infinity of the tractor-lever's straight-line and the position of 0°, 2′ 14″ in the above cited example, the functional increments of increase in the pulling (or versed sine) of the lever is .0000002″ per second of angular-travel. This functional increment is also the actual increment, there being no lost motion. Such a gradation of advance, with such infinitesimal increments, is possible only to the tractor-lever in all mechanical nature.

These ultrascopic increments must be made mechanical realities and in a machine embodying the infinite plane tractor-levers, provision must be made for an automatic pretensioning of the tractor-levers with great force upon the work (as heretofore referred to) before the bending of the plane brings the infinite pressure into action. This means that there must not be any lost motion in the machine so that the actual work upon the material is the same as the theoretic mathematical gradations of motion and of pressure described. The effect of this is that, for the first time, pressure is now so related in the infinite plane to resistance that the limit of elasticity or of stratified crystalline resistance of any substance, is passed so gently that flow or displacement, as the case may be, results without shock and without tear, or any of the destructive phenomena hitherto produced.

Obviously, no machine such as a hydraulic or mechanical punch press as now known can be used to duplicate the results obtained by a machine operating on the principles above described, for as previously stated as far as modern scientists know, nature has no duplicates in the means by which it is possible to bring into operation basic physical phenomena such as that described in connection with the use of the infinite plane mechanism. The best and only approximation that can be made to the results obtained by the infinite plane is restricted to mechanical combinations which can produce the uniform pressure continuously of the same intensity as the maximum effort exerted by an infinite plane at its first tangible degree of motion but this gives no duplication of the effects of the infinite plane since the very uniformity of such a pressure destroys the characteristic falling intensity of the pressure of the infinite plane so that the infinitesimal regulation of pressure as the infinitesimal decrease of resistance is passed, is wholly absent from any device, whether mechanical, fluid, or gaseous which may be combined in a mechanism for the purpose of imitating this result.

Figure 10:
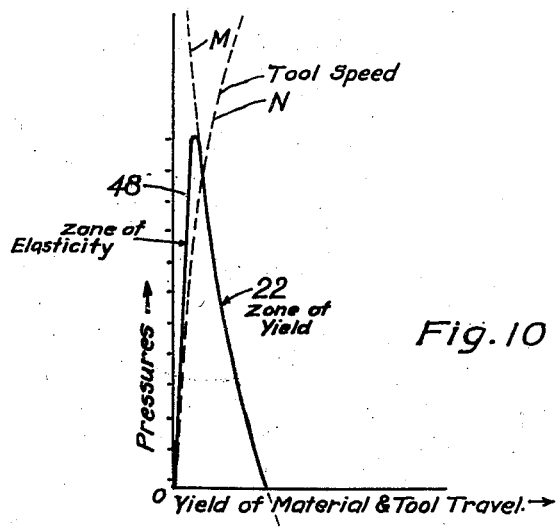
Figure 10 is a graphical illustration of the force and speed relations set up during the process.

For example, in connection with hydraulic devices, in order to produce an infinitesimal falling away of hydraulic pressure from a supreme initial intensity to a low final intensity, special valves controlled by screw devices, timed accurately to plunger transits; other devices controlled by pneumatic pressure, regulated to fine reductions by cam control; and other devices by steam compression regulated to be reduced by valvular aperture control; and other devices by electrical control for reducing valvular apertures upon such hydraulic devices have been tried and fail to produce a curve as shown in Figure 10 approximating a perfect falling parabolic curve corresponding to the infinitesimal reduction of pressure to work.

In studying experimentally the behavior of materials described when stressed beyond their elastic limits, it has been determined that in such bodies the characteristic relation between resistance and yield during disintegration or when expressed graphically, travels on a short arc of a falling parabola. Such a parabola is illustrated by curve M, Figure 10, the segment 22 being the arc referred to.

In any mechanical linkage, the velocity ratio is the inverse of the kinetic efficiency or pressure ratio. By assuming, therefore, the possibility of a pressure applying mechanism having velocity characteristics varying in a parabolic relationship exactly the inverse of curve M, as illustrated by curve N, Figure 10, the phenomenon of removal of material by structural disintegration was visualized.

By combined theoretical and empirical methods involving approximately 35,000 different sets of calculations, a single and definite combination and proportion of tractor levers and related parts were evolved, which functioning within a definite limit of angular departure from the infinite plane, namely 29° 59′, exactly maintained the above desired relationship. The parabola N therefore represents the characteristic curve of the evolved mechanism.

It is necessary at this point to consider the mathematical philosophy involved in machines utilizing the infinite plane tractor-lever principle, reference being had to the following definitions:

K. E.=kinetic efficiency=proportion of the pressure delivered by, to the pressure imparted to, any member or group of members.

K. R.=kinematic ratio=proportion of the motion delivered by, to the motion imparted to, any member or group of members.

Combined K. E.=two or more K. E.'s of a group, successively multipled together.

FORMULÆ

*Kinetic efficiency formula (for solution of all tractor-lever positions)*

$$\frac{\cosine \theta}{2 \sine \theta} = \text{kinetic efficiency}$$

Conversion formulæ

$$\frac{1}{\text{Kinetic Efficiency}} = \text{kinematic ratio (K. R.)}$$

$$\frac{1}{\text{Kinematic Ratio}} = \text{kinetic efficiency (K. E.)}$$

The foregoing formulæ are used as the basis for computing the angularities, settings, versed sine deliveries, kinetic efficiencies and kinematic ratios of infinite plane tractor-levers and mechanisms embodying the same.

Using the above formulæ, the necessary machine may be devised to obtain supreme pressures at the start of the working resistance and to diminish these pressures in an approximately perfect parabolic curve as represented by the intersection of the ordinates of pressure with the ordinates of advance of the tool 14 of the machine.

Figure 8:
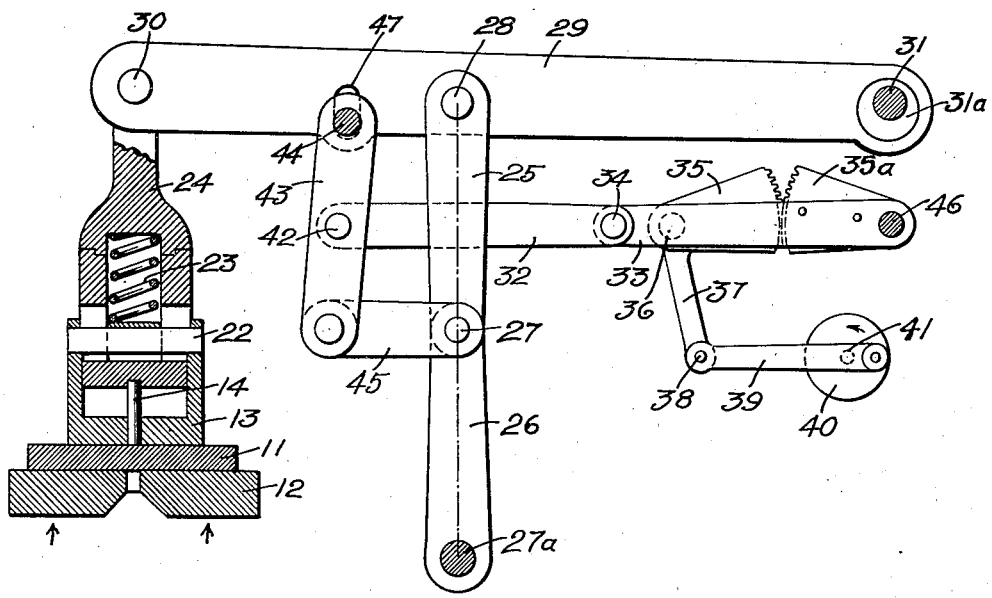
Figures 8 and 9 are diagrammatic views of a machine suitable for carrying out the process.
Figure 9:
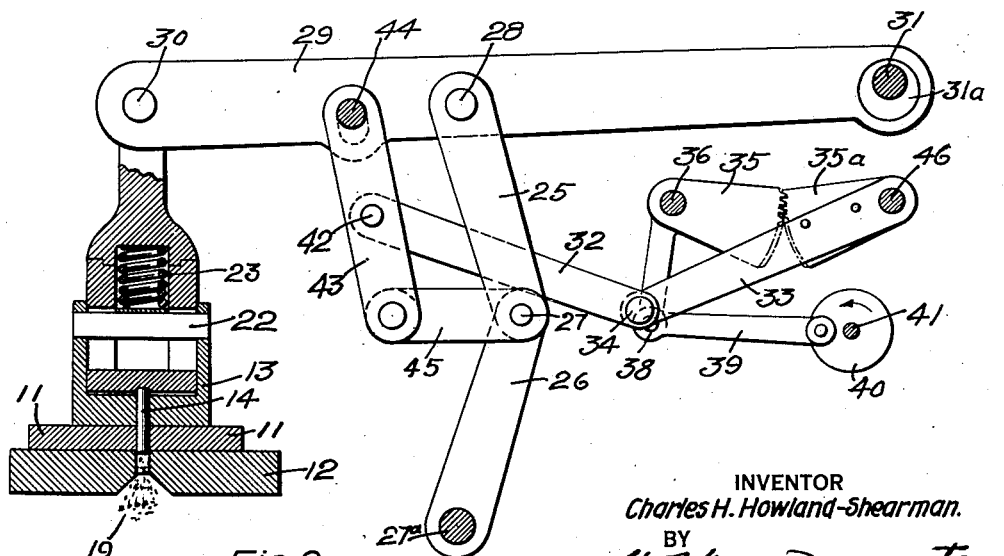

A description of a machine suitable for practicing the method herein claimed follows, it being understood that the details of construction are immaterial and that the accompanying Figures 8 and 9 are purely diagrammatic and merely illustrate the fundamentals of a machine embodying tractor levers necessary to carry out the method. In these figures the movements are exaggerated for the sake of clarity.

Referring to Figure 8 where the machine is in the "at rest" position, the initial or fracture-proofing pressure is applied by clamping the work 11 by the fracture proofer 13. The rest plate 12 is pushed upwardly in the direction of the arrows by any suitable mechanism and held fixed in relation to the framework of the machine and the pins 27a, 31, 46 hereafter referred to. The pressure for the fracture proofer 13 is determined by the cross member 22 having a spring 23 bearing downwardly thereon, the same being held in the ram 24. When the ram which carries the tool 14 is brought downward on the work 11, the spring 23 being interposed between the ram and the fracture proofer, yields but transmits to the work 11 a pressure determined by the strength or setting of the spring.

For the sake of simplicity, the supporting frame and the members necessary to keep the tool 14 vertical and to guide it and the fracture proofer during operation are not shown as these parts may be of any suitable construction.

The primary tractor levers of the machine are the levers 25, 26 which are movably joined or articulated at their mid point by a suitable pin 27. The lower lever 26 is supported on a pin 27a fixed to the framework of the machine and the upper end of lever 25 turns on a pin 28 fixed to and movable with the tool beam 29.

The tool beam or delivery member 29 at its outer or working end, has a pin 30 to which is connected the upper end of the ram 24 and at its rear end the beam is fulcrumed on an eccentric bushing 31a which in turn is fulcrumed on a pin 31 fixed in the framework of the machine.

The secondary tractor levers are indicated by the numerals 32, 33 articulated on pin 34. Secured to the lever 33 is a gear segment 35a meshing with a second segment 35 fulcrumed on a fixed pin 36 and having a downwardly extending lever 37. The lever 37 supports a wrist pin 38 which is linked by a connecting rod 39 with a suitable crank device such as the crank plate 40 driven by a power shaft 41. The outer end of lever 32 turns on a pin 42 mounted in a lever 43 pivoted at 44 to the stationary framework and connected by a link 45 with the pin 27. The rear end of lever 33 is fulcrumed on a pin 46 fixed in the framework of the machine. A slot 47 in tool beam 29 provides clearance for stationary pin 44.

At the beginning of a working stroke, pressure by any suitable means is applied upward on the rest 12 and the work 11 is clamped between the fracture proofer 13 and the rest plate 12 and is under a preoperative pressure as heretofore referred to.

The work is also pressed against the tool 14 resting on the upper surface thereof, which pressure is transmitted to the entire system of levers thereby eliminating lost motion and placing them in a position that satisfies the mathematical requirements for an infinite plane mechanism.

Power being applied to the shaft 41 and the crank disk 40 being thereby revolved in the direction of the arrow, the machine proceeds through the working stroke, that is to say, the tool 14 passes through the work 11 pushing out the blank 19 in finely divided form. As the ram comes down on the work the pre-pressure applied by the fracture-proofer 13 naturally increases due to the additional compression of the spring 23 and at the same time the primary and secondary tractor-levers and the tool beam and tool assume the positions shown in Figure 9 at the end of the working stroke and thereby fulfill the mathematical requirements necessary to translate and apply the tractor-lever force through the tool beam in order to give it a practical amplitude and to deliver the force of the levers outside of the line of the tractor levers themselves, this being the force delivered to the tool 14.

To clarify the analysis of the mathematical elements involved in a machine such as shown in Figures 8 and 9, two typical groups of triangulations will be referred to:

First, the position of the primary tractor levers 25, 26 at the end of a 1/64" tool stroke, and the corresponding position of the secondary tractor levers 32, 33 at the end of the same 1/64" stroke, Second, the position of the primary tractor levers at the end of the maximum or discharge stroke of the machine which may be taken as $1\tfrac{9}{16}''$ with the corresponding position of the secondary tractor levers at the same $1\tfrac{9}{16}''$ stroke.

By also calculating the kinetic efficiencies of the respective sets of tractor levers, at the two positions individually as well as their combined kinetic efficiencies, the extremes of efficiencies corresponding to the extremes of operation can be determined.

It will be understood that while the entire effective stroke of a machine of this character follows the laws herein set forth, as shown by the dotted curves in Figure 10, the process of disintegration of material to be ejected takes place only along the arc 22, the rising line 48 denoting the build up of pressure in overcoming the elasticity of the material. The total horizontal length of the diagram represents in this case the distance travelled by the tool to the completion of disintegration, since during the remainder of the stroke the tool is idling or following through without substantial resistance. For the sake of clarity the horizontals are exaggerated to illustrate the parabolic relationship which exists during the period of yield.

PRIMARY TRACTOR LEVERS

Ang. and K. E. at end of 1/64" tool stroke

Complete stroke of ram   = .015625"

Kinematic ratio of tool beam   = 1.5

Double D. vers. primary tractor-lever = $\dfrac{.015625''}{1.5}$ = .010417"

Reqd. D. vers. primary tractor-lever = $\dfrac{.010417''}{2}$ = .0052085"

Radius of primary tractor-levers   = 19.125"

In these calculations the following abbreviations are used:

D. = dimensional
Vers. = versed sine
Cho. = chord
Sin. = sine
Cos. = cosine
Rad. = radius
KE = kinetic efficiency or mechanical advantage
KR = kinematic ratio or velocity ratio
Ang. = angle $\dfrac{D.\ vers.}{Rad.} = \dfrac{.0052985''}{19.125''} = .0002671$ taken at .0002671 = Vers. 1° 19' 27" (error 0)

Cho. 1° 19' 27" = .0231106 × 19⅛" = .441990" = D. cho.

Sin. 1° 19' 27" = .0231090 × 19⅛" = .441960" = D. sin.

Cos. 1° 19' 27" = .9997329 × 19⅛" = 19.119892" = D. cos.

2 sin. = .44196 × 2 = .88392

$\dfrac{D.\ cos.}{2\ sin.} = \dfrac{19.119892}{.88392} = 21.630794$ = K. E. of primary tractor levers at end of 1/64" tool stroke

SECONDARY TRACTOR-LEVERS

Ang. and K. E. at end of 1/64" tool stroke

D. cho. primary at end of 1/64" tool stroke = .44199"

Kinematic ratio of tool beam   = 2.

Reqd. D. vers. secondary   = $\dfrac{.44199''}{2} \div 2$ = .110498"

Rad. of secondary tractor-levers   = 25.875"

$\dfrac{D.\ vers.}{Rad.} = \dfrac{.110498''}{25.875''} = .0042686$ taken at .0042686 = Vers. 5° 17' 45" (error 0)

Cho. 5° 17' 45" = .0923968 × 25⅞" = 2.390767" = D. cho.

Sin. 5° 17' 45" = .0923465 × 25⅞" = 2.389466" = D. sin.

Cos. 5° 17' 45" = .9957314 × 25⅞" = 25.764550" = D. cos.

2 Sin. = 2.389466 × 2 = 4.778932

$\dfrac{D.\ cos.}{2\ sin.} = \dfrac{25.76455}{4.778932} = 5.391278$ = K. E. of secondary tractor-levers at end of 1/64" tool stroke $\dfrac{5.391278}{2} = 2.695639$ combined K. E. secondary and tractor beam 21.630794 × 2.695639 = 58.308065 = Combined K. E. of primary and secondary tractor-levers and tractor beam, at end of 1/64" tool stroke From the foregoing mathematical analysis, the following will be evident.

First, that between the extremes of these two efficiencies there are actual infinite series of gradations of kinetic efficiencies, kinematic ratios and corresponding motion-pressure increments which are found in the intermediate transit between the extremes given, between the minimum or initial and maximum conditions.

Second, that if the secondary tractor lever is actuated, for example, by a motor, a speed reducer and a crank mechanism, that in the initial position above computed stupendous and substantially resistless pressures can be readily developed from a very small motor actuation, for example, in connection with a practical machine, a 10 H. P. motor produces pressure far in excess of what would be developed with a motor fifteen times as large using other forms of mechanical elements, such as gear-trains and the like.

By triangulating the intermediate stages of the progress of a tool 14 driven by the primary tractor lever between 1/64" and 1.5625" say in $\frac{1}{32}$" increments of motion and corresponding increments of kinetic efficiency, it will be found that the decrements of pressure precisely correspond to the decrements of resistance in the material being worked, and that the relativity of the elements of each pair of accelerating motion-increments is exactly inverse to the relativity of the elements of the corresponding pair of pressure-decrements.

Summarizing the mathematical philosophy of the foregoing, it has been found that there is no actual infinite kinetic efficiency in the series; that starting with the maximum kinetic efficiency representing a finite value of the initial pair, at departure from the initial angle and ending with the minimum kinetic efficiency of the final pair whose limit is the final angle, there are a series of decrements of pressure precisely corresponding to the decrements of resistance presented by the work being done, and that the ratio between the elements of each pair of accelerating motion increments is precisely inverse to the relativity of the corresponding pair of pressure-decrements.

This process may be used to produce in a single operation a large number of objects that heretofore required several operations for their completion,—for example, internal gears, cast iron yokes, perforated glass parts, etc.

The phenomenon of cold ejection as described herein is so closely associated with the method for producing the same and the apparatus necessary in order to carry out the method, that the phenomena constituting a discovery, the invention and the apparatus necessary to practice same have been disclosed together. It should be understood, however, that the disclosure of the apparatus herein made is for the sole purpose of clearly setting forth how the method herein disclosed should be performed, and that such apparatus forms the subject matter of other applications for patent thereon.

What is claimed is:

1. The method of working material composed of non-cemented dissociate crystals which consists of subjecting the material to be preserved to a compressive pre-pressure throughout an area adjacent the material to be worked thereby mapping a work area, subjecting the material in said work area to a pre-pressure, increasing said last pressure by a relatively large force applied at low initial speed, and increasing said speed so that when same is graphically represented it will fall upon a parabolic curve proportionate to the curve of yield of said work portion while maintaining said first pre-pressure on the material to be preserved.

2. The method of working material composed of non-cemented dissociate crystals which consists of subjecting the material to be preserved to a compressive pre-pressure throughout an area adjacent the material to be worked thereby mapping a work area, subjecting the material in said work area to a pre-pressure, increasing said last pressure by a relatively large force applied at low initial speed, and increasing said speed so that when same is graphically represented it will fall upon a parabolic curve proportionate to the curve of yield of said work-portion thereby producing structural disintegration of a part of same while maintaining said first pre-pressure on the material to be preserved.

3. The method of forming smooth surfaces on substances comprising non-cemented dissociate crystals by submitting a part of the substance to be preserved to a compressive pre-pressure while applying a working pressure to a portion of the substance to be worked to eject same from the substance, the parting surfaces on the substance being smoothed by the ejection of the material of the portion being worked.

4. The method of working material which includes that step of applying pressure to an area thereof at a speed varying in proportion to the progressive failure of the material from the bottom upwards to the surface on which said pressure is applied.

5. The method of working material which consists of subjecting the material to be preserved to a compressive pre-pressure, subjecting a portion of said material to be worked to an initial pressure, increasing said last pressure until the mass of said portion suddenly breaks into powdered or granule form, and ejecting said portion so broken from the preserved material.

6. The method of working material which consists of subjecting the material to be preserved to a compressive pre-pressure, subjecting a portion of said material to be worked to an initial downward pressure, increasing said downward pressure until said portion of material to be worked is subjected to internal stresses tending to separate its structure into horizontal strata or layers whereby outward compressive components are set up on the reverse side of said area to that on which the working pressure is applied, causing a downward movement of said portion being worked, whereby its lower mass is placed in tensile stress tending to separate the structure thereof, and finally causing failure of the lower layer of said structure, thereby transferring the stress applied thereto to successive layers above said lowest layer until the entire portion to be worked is expelled from the material to be preserved.

7. The method of working material which consists of subjecting the material to be preserved to a compressive pre-pressure, defining a work area in said material by means of additional pressure applied thereto thereby defining a plane of parting therein, applying a continuous working pressure to a portion of the material defined by said plane of parting, and ejecting said portion from the material to be preserved.

8. That method of removing a predetermined area of material from a work-piece which consists in producing by pressure a partial disintegration in the material of said area adjacent to the main body of material, and removing from the work-piece all of the material in said area by the application of external pressure applied to the predetermined area.

9. The method of cold working material which consists of forming a substantially smooth surface within said material by applying pressure to a portion thereof and using said portion to form said smooth surface in said material by ejecting said portion while under pressure through said material, thereby using said portion as a tool to work thereon.

CHARLES H. HOWLAND-SHEARMAN.